United States Patent
Wang et al.

(10) Patent No.: US 8,929,462 B2
(45) Date of Patent: Jan. 6, 2015

(54) SYSTEM AND METHOD FOR IMPLEMENTING LOW-COMPLEXITY MULTI-VIEW VIDEO CODING

(75) Inventors: Ye-Kui Wang, Tampere (FI); Miska Hannuksela, Ruutana (FI); Ying Chen, Tampere (FI)

(73) Assignee: Nokia Corporation, Espoo (FI)

( * ) Notice: Subject to any disclaimer, the term of this patent is extended or adjusted under 35 U.S.C. 154(b) by 1979 days.

(21) Appl. No.: 11/854,470

(22) Filed: Sep. 12, 2007

(65) Prior Publication Data

US 2008/0095234 A1    Apr. 24, 2008

Related U.S. Application Data

(60) Provisional application No. 60/853,196, filed on Oct. 20, 2006.

(51) Int. Cl.
| | |
|---|---|
| H04N 7/12 | (2006.01) |
| H04N 19/00 | (2014.01) |
| H04N 19/156 | (2014.01) |
| H04N 19/597 | (2014.01) |
| H04N 19/31 | (2014.01) |
| H04N 19/103 | (2014.01) |
| H04N 19/189 | (2014.01) |
| H04N 19/187 | (2014.01) |

(52) U.S. Cl.
CPC ....... *H04N 7/26335* (2013.01); *H04N 7/26202* (2013.01); *H04N 19/00769* (2013.01); *H04N 19/0043* (2013.01); *H04N 7/26026* (2013.01); *H04N 7/26313* (2013.01); *H04N 7/26297* (2013.01)
USPC ................. 375/240.26; 375/240.24

(58) Field of Classification Search
USPC ....................... 375/240.24, 240.25
See application file for complete search history.

(56) References Cited

U.S. PATENT DOCUMENTS

| | | | |
|---|---|---|---|
| 6,341,330 B1 | 1/2002 | Decarmo | |
| 2005/0137958 A1* | 6/2005 | Huber et al. | 705/37 |
| 2006/0064716 A1* | 3/2006 | Sull et al. | 725/37 |

(Continued)

FOREIGN PATENT DOCUMENTS

JP          09261653 A      10/1997

OTHER PUBLICATIONS

Wiegand et al., Overview of the H.264/AVC Video Coding Standard. IEEE Transactions on Circuits and Systems for Video Technology, 13(7): 560-576, 2003.

(Continued)

*Primary Examiner* — Phirin Sam
*Assistant Examiner* — Mounir Moutaouakil
(74) *Attorney, Agent, or Firm* — Alston & Bird LLP (57) ABSTRACT

A system and method for implementing low complexity multi-view video coding. According to various embodiments, single-loop decoding is applied to multi-view video coding. For N coded views, where only M of the N views are to be displayed, only those M views are required to be fully decoded and stored to a decoded picture buffer (DPB) when needed. Pictures of other views are only partially decoded or simply parsed and do not have to be stored into the DPB. Various embodiments also provide for an encoder that encodes multi-view video bitstreams in accordance with the single-loop decoding concept, as well as a decoder that utilizes single-loop decoding to decode and output on a subset of the encoded views from a multi-view bitstream.

56 Claims, 8 Drawing Sheets

(56) References Cited

U.S. PATENT DOCUMENTS

| | | | | |
|---|---|---|---|---|
| 2006/0233243 | A1* | 10/2006 | Ridge et al. | 375/240.08 |
| 2006/0233247 | A1* | 10/2006 | Visharam et al. | 375/240.12 |
| 2006/0262856 | A1* | 11/2006 | Wu et al. | 375/240.19 |
| 2008/0095228 | A1* | 4/2008 | Hannuksela et al. | 375/240.01 |
| 2008/0205511 | A1* | 8/2008 | Hannuksela et al. | 375/240.01 |
| 2009/0010323 | A1* | 1/2009 | Su et al. | 375/240.01 |
| 2009/0220010 | A1* | 9/2009 | Park et al. | 375/240.25 |
| 2010/0002761 | A1* | 1/2010 | Pandit et al. | 375/240.01 |
| 2010/0202521 | A1* | 8/2010 | Koo et al. | 375/240.13 |
| 2010/0266042 | A1* | 10/2010 | Koo et al. | 375/240.16 |

OTHER PUBLICATIONS

International Search Report for PCT Application No. PCT/IB2007/053491.

English Translation of Office Action for Chinese Application No. 200780045871.3 dated Sep. 10, 2010.

Schwarz, H. et al., "Constrained Inter-Layer Prediction for Single-Loop Decoding in Spatial Scalability", Image Processing, vol. 2, pp. 870-873, Sep. 2005.

"Requirements on Multi-view Video Coding", ITU Study Group 16—Video Coding Experts Group-ISO/IEC MPEG & ITU-T VCEG (ISO/IEC JTC1/SC29/WG11 and ITU-T SG16 Q6), No. N7539, Oct. 2005.

Mueller, Karsten et al., "Multiview Coding using AVC," ITU Study Group 16—Video Coding Experts Group-ISO/IEC MPEG & ITU-T VCEG (ISO/IEC JTC1/SC29/WG11 and ITU-T SG16 Q6), No. M12945, Jan. 2006.

Supplementary European Search Report / Search Opinion for Application No.; 07826206.0, dated Jun. 8, 2011.

Office Action for European Application 07826206.0, dated Nov. 25, 2014.

Kimata et al. "System Design of Free Viewpoint Video Communication", *The Fourth International Conference on Computer and Information Technology (CIT' 04)*, Sep. 14, 2004, 52-59, Los Alamitos, US.

Lim et al., "A Multiview Sequence CODEC with View Scalability", *Image Communication* 19, 2004, 239-256, Elsevier Science Publishers, Amsterdam, NL.

* cited by examiner

Figure 6 though their decoding order is continuous without any other pictures to be inserted between any two of the pictures, internally their decoding order may change.

SYSTEM AND METHOD FOR IMPLEMENTING LOW-COMPLEXITY MULTI-VIEW VIDEO CODING

FIELD OF THE INVENTION

The present invention relates generally to video coding. More particularly, the present invention relates to the enabling of multi-view video coding with a minimized level of complexity in terms of decoding processing and buffer requirements.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In multi-view video coding, video sequences output from different cameras, each corresponding to different views of a scene, are encoded into one bitstream. After decoding, to display a certain view, the decoded pictures belonging to that view are reconstructed and displayed. It is also possible for more than one view to be reconstructed and displayed.

Multiview video coding possesses a wide variety of applications, including free-viewpoint video/television, three dimensional (3D) TV and surveillance applications. Currently, the Joint Video Team (JVT) of the International Organization for Standardization (ISO)/International Engineering Consortium (IEC) Motion Picture Expert Group (MPEG) and International Telecommunication Union (ITU)-T Video Coding Expert Group is working to develop a multiview video coding (MVC) standard, which is becoming an extension of the ITU-T H.264 standard, also known as ISO/IEC MPEG-4 Part-10. These draft standards as referred to herein as MVC and AVC, respectively. The latest draft of the MVC standard is described in JVT-T208, "Joint Multiview Video Model (JMVM) 1.0", 20$^{th}$ JVT meeting, Klagenfurt, Austria, July 2006, can be found at ftp3.itu.ch/av-arch/jvt-site/2006_07_Klagenfurt/JVT-T208.zip, and is incorporated herein by reference in its entirety.

Figure 1A:
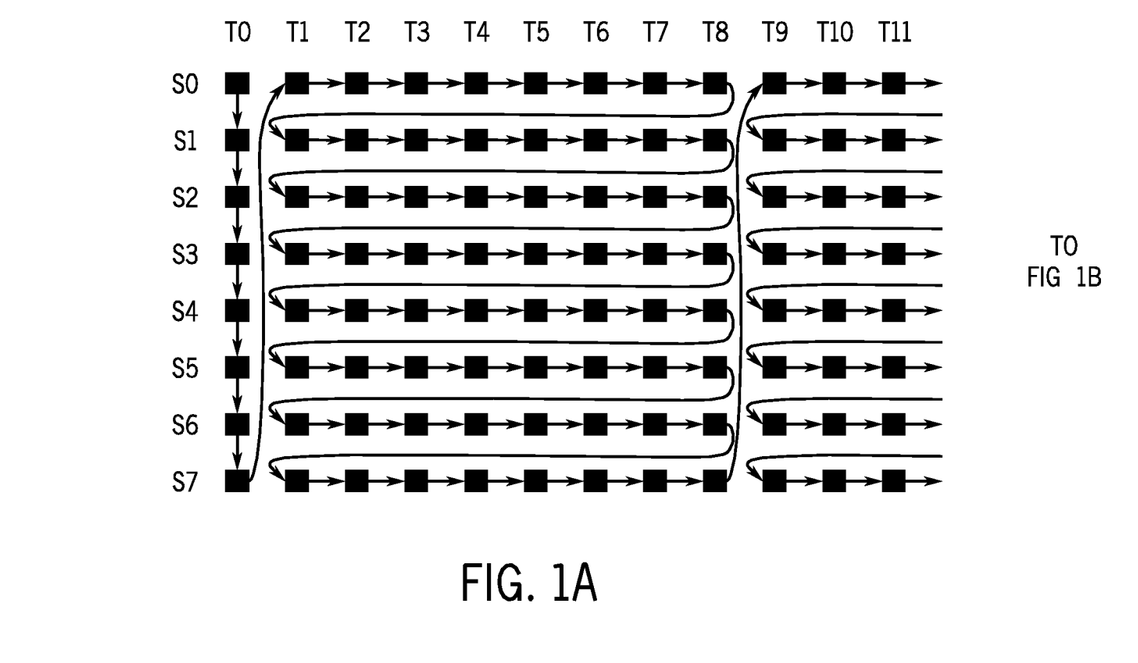
FIG. 1 is an arrangement of pictures in a first-view coding arrangement.
Figure 1B:
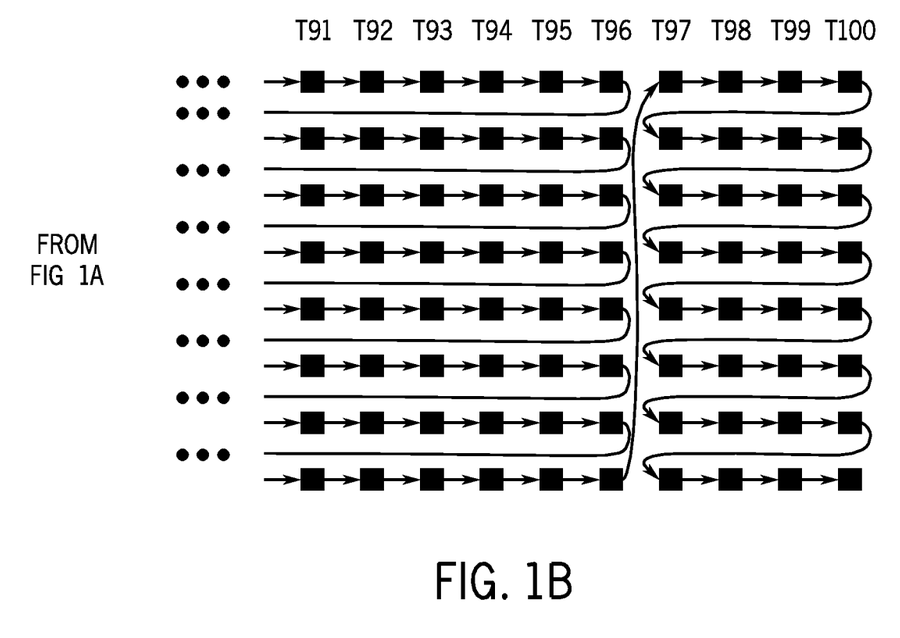
Figure 2:
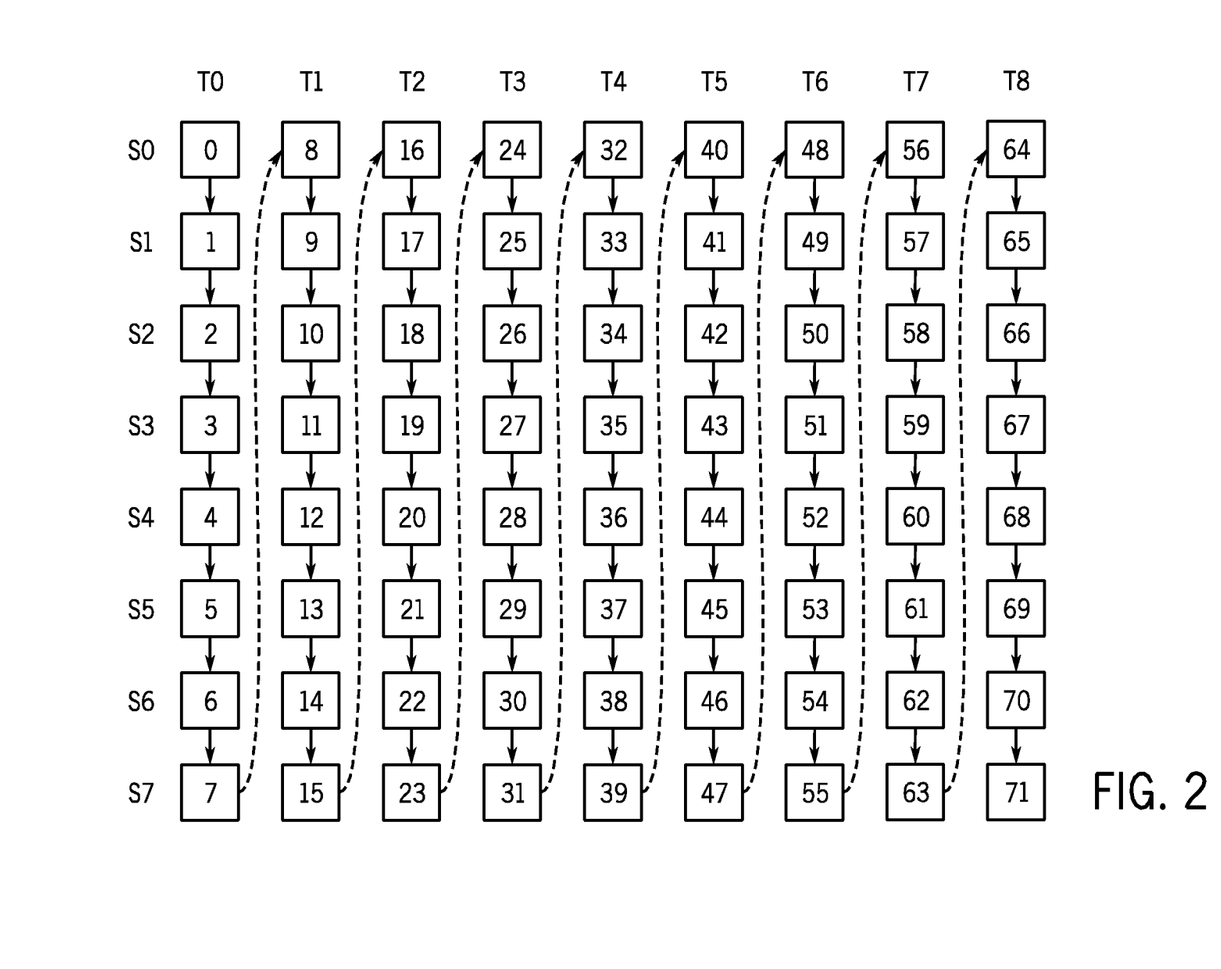
FIG. 2 is an arrangement of pictures in a time-first coding arrangement.

In JMVM 1.0, for each group of pictures (GOP), pictures of any view are contiguous in decoding order. This is depicted in FIG. 1, where the horizontal direction denotes time (with each time instant being represented by Tm) and the vertical direction denotes view (with each view being represented by Sn). Pictures of each view are grouped into GOPs, e.g. pictures T1 to T8 in FIG. 1 for each view form a GOP. This decoding order arrangement is referred to as view-first coding. It should be noted that, for the pictures in one view and in one GOP, al It is also possible to have a different decoding order than that discussed for first-view coding. For example, pictures can be arranged such that pictures of any temporal location are contiguous in decoding order. This arrangement is shown in FIG. 2. This decoding order arrangement is referred to as time-first coding. It should also be noted that the decoding order of columns (T0, T1, etc.) may not be identical to the temporal order.

Figure 3A:
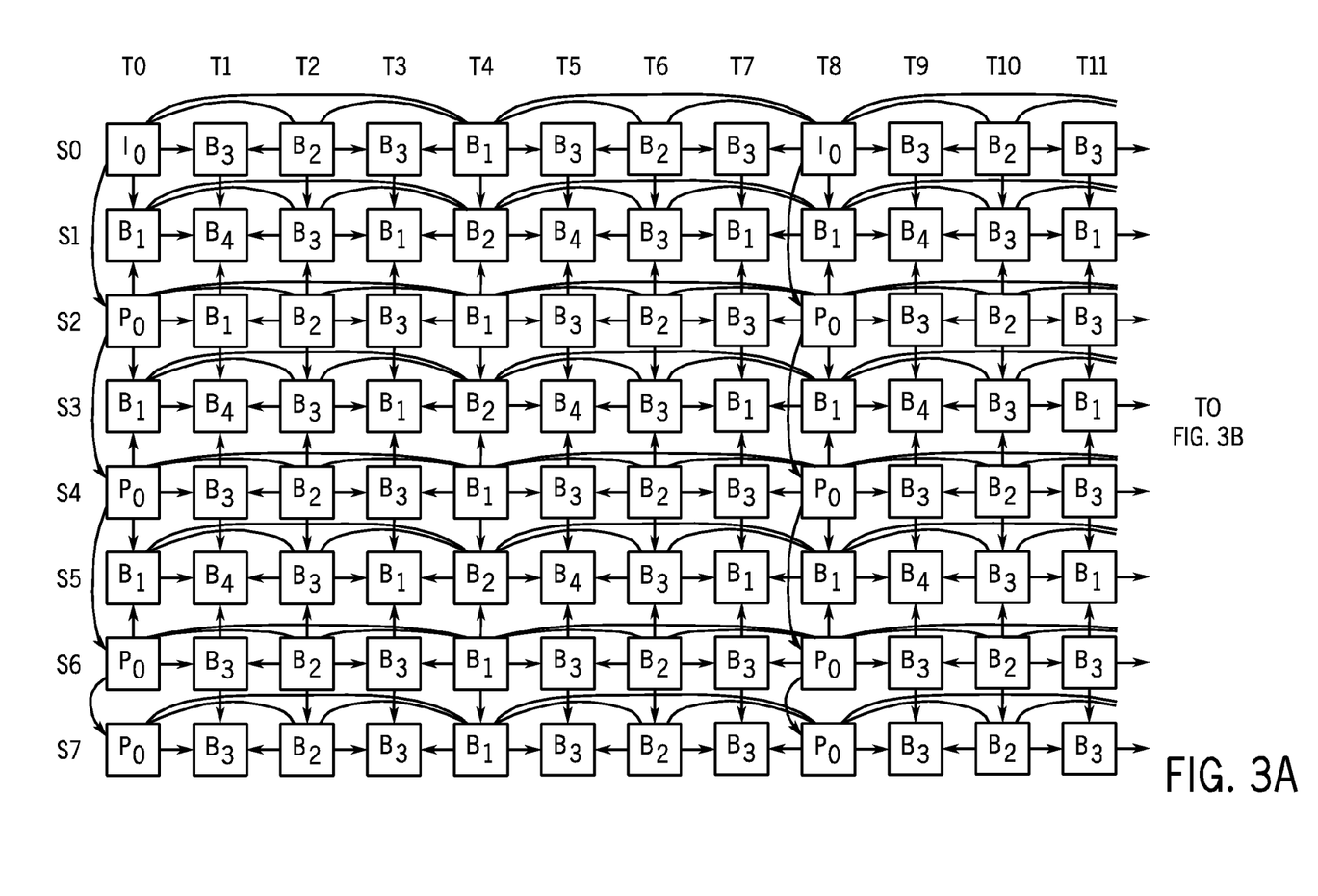
FIG. 3 is a depiction of an example MVC temporal and inter-view prediction structure.
Figure 3B:
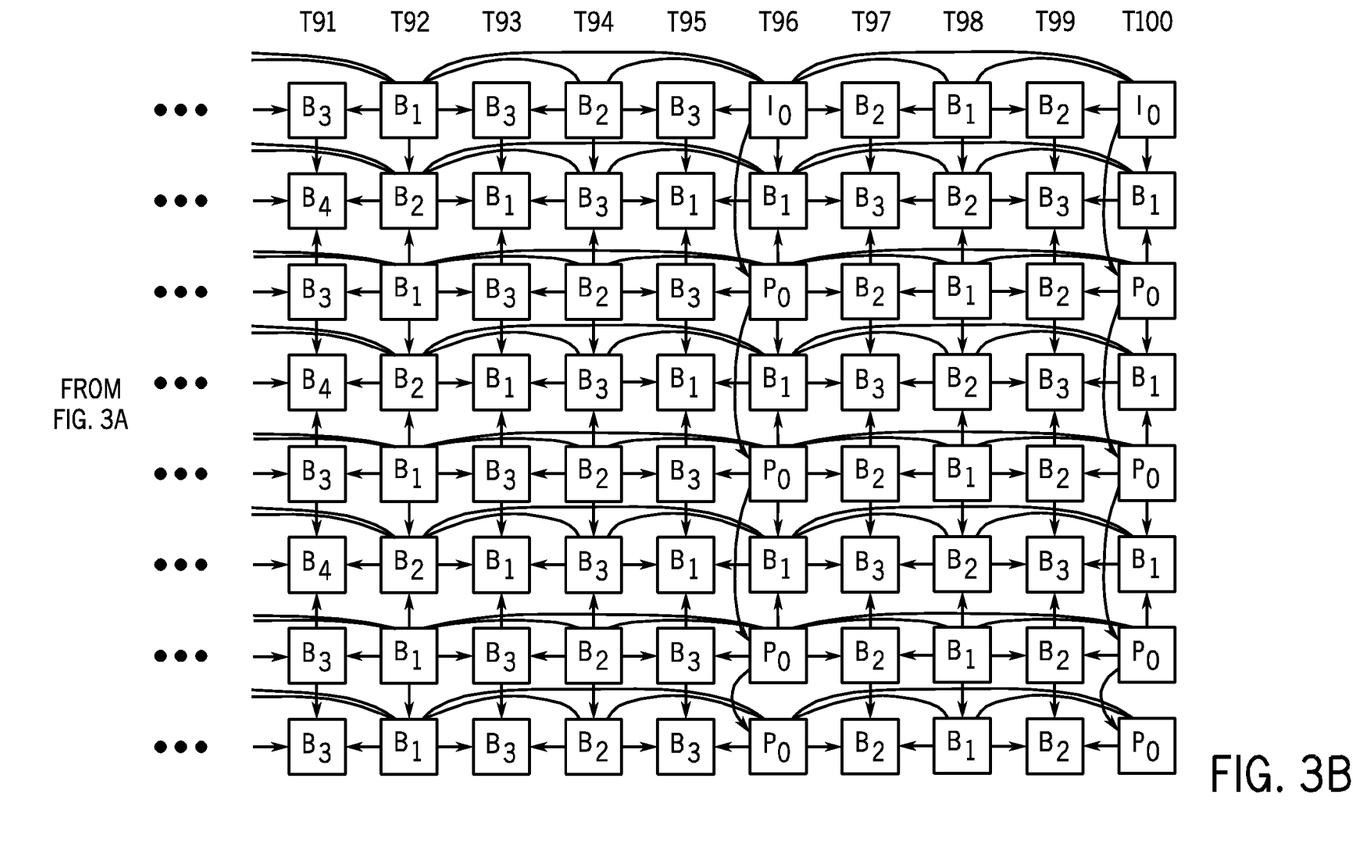

A typical prediction structure (including both inter-picture prediction within each view and inter-view prediction) for multi-view video coding is shown in FIG. 3, where predictions are indicated by arrows, and the pointed-to object uses the pointed-from object for prediction reference. For views that share the same sequence parameter set (SPS), JMVM 1.0 provides the dependencies among views in a MVC SPS extension.

According to JMVM 1.0, given a MVC bitstream, for any view to be displayed, the pictures of the view and all other views the view directly or indirectly relies on, must be fully decoded and reconstructed. In this situation, "View A directly depends on view B" means that at least one picture in view B is used by a picture in view A for inter-view prediction. If "View A indirectly depends on view C," this means that no picture in view C is used by any picture in view A for inter-view prediction, but View A cannot be correctly decoded without View C. For example, if view A directly depends on view B and view B directly depends on view C, then view A indirectly depends on view C. These relationships result significant decoding processing capability requirements, which therefore results in a high decoder implementation complexity and power consumption.

In addition to the above, when the number of views is large, both for time-first and view-first coding, the buffer size required for storing pictures used for inter-view prediction or temporal prediction becomes quite large. For example, when a hierarchical B GOP structure (the coding structure used in the time dimension in FIG. 3) is used in both the time dimension and the view dimension, for view-first coding, the required buffer size is equal to number_of_views+GOP_length*(1+
   log 2(number_of_views))+log 2(GOP_length)

In the above equation, "GOP_length" is the length of the GOP in number of pictures. When "GOP_length" is equal to 16 and "number_of_views" is equal to 17, the required buffer size is 101, in units of decoded frames.

As factors such as complexity, power consumption, and buffer size increase, an end result will ultimately involve a higher cost for devices capable of supporting multi-view decoding. These costs will become especially prohibitive for mobile devices, where space constraints inevitably result in still higher component costs. It would therefore be desirable to provide an arrangement where these complexities can be reduced efficiently.

SUMMARY OF THE INVENTION

The present invention provides a system and method for applying single-loop decoding to multi-view video coding. According to various embodiments of the present invention, for N coded views, where only random M of the N views are to be displayed, then only those M views are required to be fully decoded and stored to a decoded picture buffer (DPB) when needed. Pictures of other views are only partially decoded or simply parsed and do not have to be stored into the DPB. The various embodiments also provide for an encoder that encodes multi-view video bitstreams in accordance with the single-loop decoding concept, as well as a decoder that utilizes single-loop decoding to decode and output on a subset of the encoded views from a multi-view bitstream. This system greatly reduces the complexity and buffer size requirements of a device, thereby reducing the cost of the device.

These and other advantages and features of the invention, together with the organization and manner of operation thereof, will become apparent from the following detailed description when taken in conjunction with the accompany-

DETAILED DESCRIPTION OF THE PREFERRED EMBODIMENTS

Figure 4:
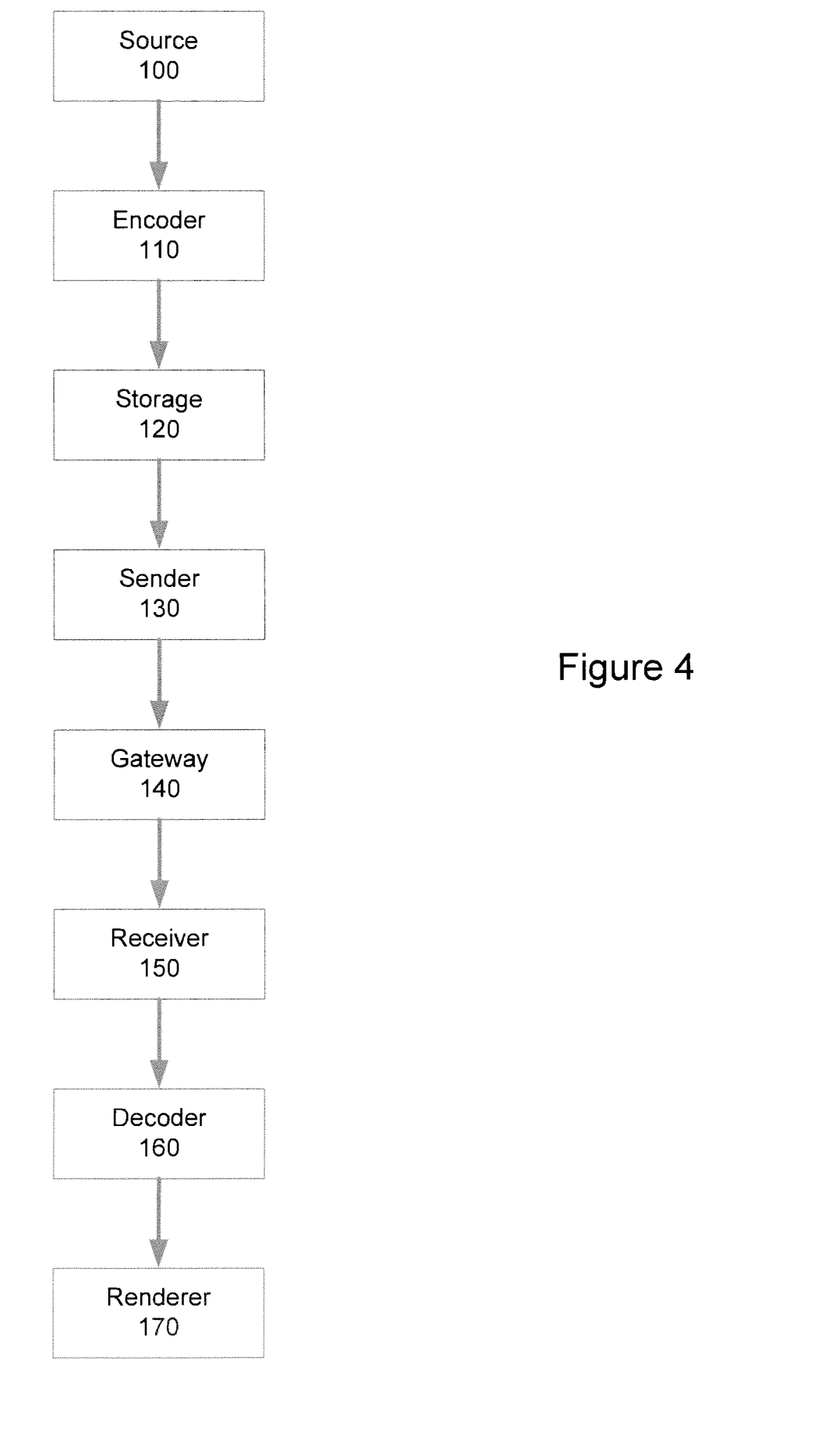
FIG. 4 is an overview diagram of a system within which the present invention may be implemented.

FIG. 4 shows a generic multimedia communications system for use with the present invention. As shown in FIG. 4, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

It should be understood that, although text and examples contained herein may specifically describe an encoding process, one skilled in the art would readily understand that the same concepts and principles also apply to the corresponding decoding process and vice versa. It should be noted that the bitstream to be decoded can be received from a remote device located within virtually any type of network. Additionally, the bitstream can be received from local hardware or software.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 5:
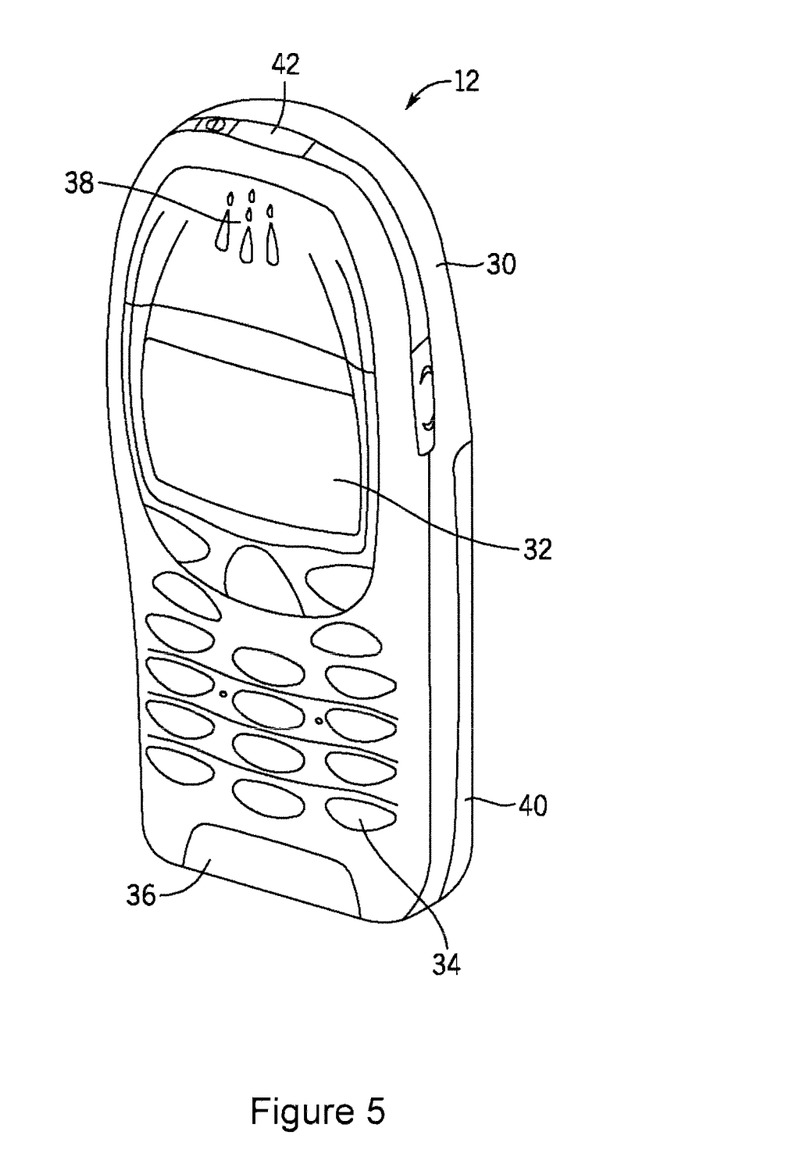
FIG. 5 is a perspective view of a mobile device that can be used in the implementation of the present invention.
Figure 6:
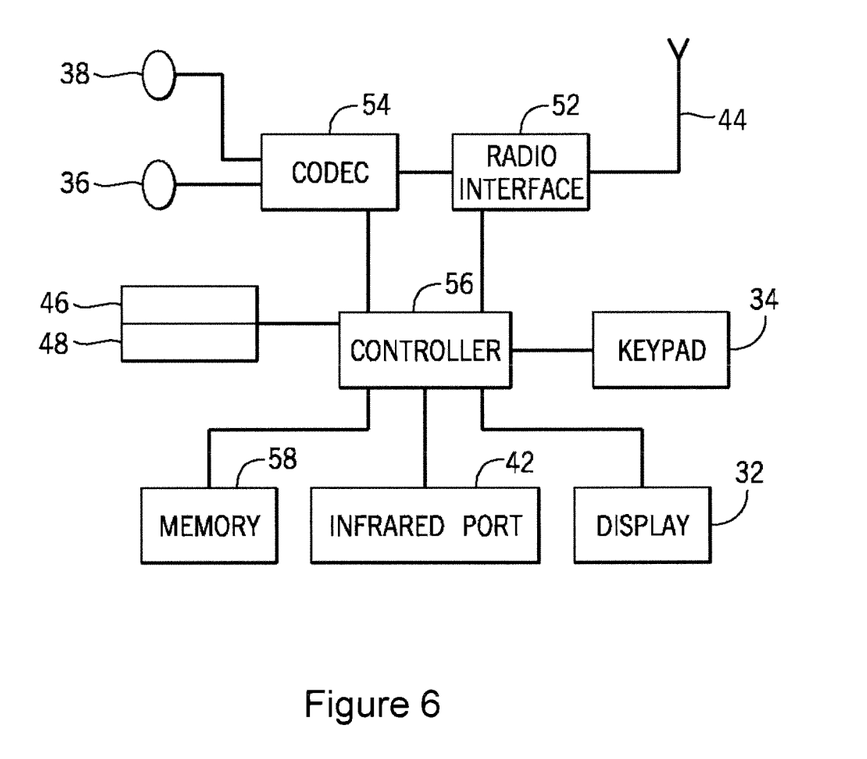
FIG. 6 is a schematic representation of the circuitry of the mobile device of FIG. 5.

FIGS. 5 and 6 show one representative mobile device 12 within which the present invention may be implemented. It should be understood, however, that the present invention is not intended to be limited to one particular type of mobile device 12 or other electronic device. Some or all of the features depicted in FIGS. 5 and 6 could be incorporated into any or all devices that may be utilized in the system shown in FIG. 4.

The mobile device 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile devices.

Various embodiments of the present invention provide a system and method for applying single-loop decoding to multi-view video coding. According to various embodiments of the present invention, for N coded views, where only random M of the N views are to be displayed, then only those M views are required to be fully decoded and stored to a decoded picture buffer (DPB) when needed. Pictures of other views are only partially decoded or simply parsed and do not have to be stored into the DPB. The various embodiments also provide for an encoder that encodes multi-view video bitstreams in accordance with the single-loop decoding concept, as well as a decoder that utilizes single-loop decoding to decode and output on a subset of the encoded views from a multi-view bitstream.

Single-loop decoding is conventionally used in Scalable Video Coding and is enabled by using a constrained intra-texture prediction mode. In scalable video coding, a video signal can be encoded into a base layer and one or more enhancement layers constructed in a pyramidal fashion. An enhancement layer enhances the temporal resolution (i.e., the frame rate), the spatial resolution, or simply the quality of the video content represented by another layer or part thereof. Each layer, together with all its dependent layers, is one representation of the video signal at a certain spatial resolution, temporal resolution and quality level. As discussed herein, a scalable layer together with all of its dependent layers is referred to as a "scalable layer representation". The portion of a scalable bitstream corresponding to a scalable layer representation can be extracted and decoded to produce a representation of the original signal at certain fidelity.

With a constrained intra-texture prediction mode, which is used for single-loop decoding in SVC, the inter-layer intra-texture prediction can be applied to macroblocks (MBs) for which the corresponding block of the base layer is located inside intra-MBs. At the same time, those intra-MBs in the base layer use constrained intra-prediction. In single-loop decoding, the decoder needs to perform motion compensation and full picture reconstruction only for the scalable layer desired for playback (referred to herein as the desired layer), thereby greatly reducing decoding complexity. All of the layers other than the desired layer do not need to be fully decoded because all or part of the data of the MBs not used for inter-layer prediction (whether for inter-layer intra-texture prediction, inter-layer motion prediction or inter-layer residual prediction) are not needed for reconstruction of the desired layer. A single decoding loop is needed for decoding of most pictures, while a second decoding loop is applied to reconstruct the base representations, which are needed for prediction reference but not for output or display, and are reconstructed only for "key" pictures.

A first exemplary method of the present invention is based on JMVM 1.0 and is as follows. According to this method, a particular flag is signaled in the bitstream, e.g. in the MVC SPS extension. This flag indicates that, to display any M of the N coded views, only pictures of the M views need to be fully decoded.

A pair of constraints are applied during encoding of the MVC bitstream. In one particular embodiment of the present invention, for any block in a coded picture, when inter-view prediction is used, the inter-view prediction signal only comes from intra-coded blocks for which constrained intra-prediction were used. If constrained intra-prediction is in use for an intra-coded block, then any data from inter-coded blocks is not used for intra-prediction when encoding the intra-coded block. Second, the decoded signal of the intra-coded blocks used for inter-view prediction is the signal before loop filtering is applied.

In decoding, only the pictures in the views to be displayed are fully decoded. These views are referred to as the target views. For other views depended upon by the target views, only those constrainedly intra-coded blocks are decoded for inter-view prediction. Other blocks are only needed to be parsed to the extent that it is known that they are not needed for inter-view prediction. The decoded data of the constrainedly intra-coded blocks of the views the target views rely on are stored in a temporal buffer, which is typically not very large. Alternatively, the picture in a target view and its inter-view reference pictures can be decoded synchronously, i.e. the macroblocks in address A in each one of the inter-view reference pictures is decoded, provided that they are constrainedly intra-coded, just before the macroblock in address A in the target view picture, provided that the motion vector used for the inter-view prediction of the macroblock in address A in the target view picture does not point to the right or bottom direction indicated by the macroblocks in address A in each of the inter-view reference pictures.

The fully decoded pictures are stored in the DPB when they are required either for output or prediction reference. The pictures of any view that is neither a target view nor a view depended on by any target view can be simply discarded. Due to the fact that only the pictures of the target views needs to be stored in the DPB and managed by the DPB management process, a much smaller DPB size is needed when compared to the arrangement described in JMVM 1.0. Furthermore, due to the fact that motion compensation (including sub-pixel interpolation) and loop filtering etc. operations do not need to be performed for pictures in the views depended on by the target views, the decoding complexity is greatly simplified.

In one particular embodiment of the present invention, signal elements for different information can signaled. For example, for each value of M (in the range of 1 to N, inclusive), the maximum number of reference frames and the required DPB size when only M of the N coded views are randomly selected and decoded for playback. These signal elements may be signaled in the bitstream, e.g., in the MVC SPS extension or in a supplemental enhancement information (SEI) message.

According to another embodiment, signal elements for each value of M (in the range of 1 to N, inclusive) are signaled to indicate the maximum decoding level, i.e. the maximum quantized resource consumption for decoding similar to the levels specified in Annex A of the H.264/Advanced Video Coding (AVC) standard, required when any M of the N coded view are selected for decoding. These signal elements may also be signaled in the bitstream, e.g., in the MVC SPS extension or in a supplemental enhancement information (SEI) message. For this particular embodiment, it is assumed that level definitions can consider intra-blocks in depend-on views as reconstructed pixels, and therefore levels would constrain how deep and extensive inter-view prediction can be performed.

In accordance with still another embodiment, inter-view prediction of block coding mode, motion information or residual information is used to improve coding efficiency. This information is used in a manner similar to that specified in SVC for inter-layer prediction of block coding mode, motion information or residual information. These inter-view predictions may be further extended to involve motion compensation such that a prediction of block coding mode, motion information, or residual information may come from non-collocated blocks of the current block being encoded/decoded. This involving of motion compensation is similar to the inter-view prediction of intra-sample values from constrainedly intra-coded blocks. These signal elements may also be signaled in the bitstream.

Another exemplary method for implementation is based on SVC and is as follows. In some cases of SVC, data in an enhancement layer can be truncated after a certain location, or at arbitrary positions, where each truncation position may include additional data representing increasingly enhanced visual quality. Such scalability is referred to as fine-grained (granularity) scalability (FGS). In contrast to FGS, the scalability provided by those enhancement layers that cannot be truncated is referred to as coarse-grained (granularity) scalability (CGS). It collectively includes the traditional quality (SNR) scalability and spatial scalability. In this particular method, the CGS quality scalable coding technique, i.e., CGS excluding spatial scalability, specified in SVC is applied for coding of multi-view video. In this situation, each CGS quality scalable layer corresponds to a view. Each value of dependency_id corresponds to the view_id of the view associated with the dependency_id value. The decoding process and other aspects are the same as what is specified in the SVC specification, except that more than one view, each coded as a CGS quality scalable layer, may be full decoded and outputted.

To allow for more views, the coded length of dependency_id can be extended, e.g. to 10 bits as view_id is specified in JMVM 1.0. In addition, a particular flag can be signaled, e.g. in the SVC SPS extension, to indicate whether the bitstream is a multi-view bitstream or SVC bitstream.

For inter-layer prediction (i.e. inter-view prediction in a multi-view context) of intra-sample values, block coding modes, motion information or residual information, motion compensation may be involved such that a prediction of any of this information may come from non-collocated blocks of the current block being encoded/decoded. This means that additional motion information needs to be signaled for inter-layer prediction (i.e. inter-view prediction in multi-view context).

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   encoding a plurality of multiview video picture sequences into a bitstream of coded pictures, wherein the multiview video comprises a plurality of views of a scene;
   encoding signal information including a signal element into the bitstream, said signal element indicating that display of a subset M of N coded views requires full decoding of the subset M views only, said subset M views comprising target views within the bitstream, wherein the signal information includes an additional signal element indicating inter-view prediction, wherein the interview prediction comprises a prediction associated with a first view of the multiview video picture sequence based on a second view of the multiview video picture sequence; and
   encoding constrainedly intra-coded blocks for inter-view prediction in support of said target views.

2. The method of claim 1, wherein each of the plurality of picture sequences represents a sequence of pictures taken from a particular view.

3. The method of claim 2, wherein the signal element is encoded in a multiview video coding (MVC) sequence parameter set (SPS) extension.

4. The method of claim 1, wherein for picture sequences depended upon by the subset of the plurality of picture sequences, only constrainedly intra-coded blocks are to be decoded for inter-view prediction.

5. The method of claim 4, wherein non-constrainedly intra-coded blocks are to be parsed to the extent that is known that the non-constrainedly intra-coded blocks are not needed for inter-view prediction.

6. The method of claim 1, wherein the signal element indicates a maximum decoding level for a particular picture sequence.

7. The method of claim 1, wherein the signal element indicates a maximum number of reference frames and a required decoded picture buffer size when the subset of the plurality of picture sequences are decoded for playback.

8. The method of claim 1, wherein the additional signal element indicates inter-view prediction of a block coding mode.

9. The method of claim 1, wherein the additional signal element indicates inter-view prediction of motion information.

10. The method of claim 1, wherein the additional signal element indicates inter-view prediction of residual information.

11. The method of claim 1, wherein the additional signal element indicates inter-view prediction of motion compensation.

12. The method of claim 1, wherein the signal information includes a dependency_id value, the dependency_id value corresponding to one of the plurality of picture sequences.

13. The method of claim 1, wherein the signal information includes an indication of whether the bitstream comprises either a multiview bitstream or a scalable video coding bitstream.

14. A computer program product comprising a non-transitory computer readable storage medium having computer coded instructions stored therein, said instructions when executed by a processor causing an apparatus to perform:
   encoding a plurality of multiview video picture sequences into a bitstream of coded pictures, wherein the multiview video comprises a plurality of views of a scene;
   encoding signal information including a signal element into a bitstream, said signal element indicating that display of a subset M of N coded views requires full decoding of the subset M views only, said subset M views comprising target views within the bitstream, wherein the signal information includes an additional signal element indicating inter-view prediction, wherein the inter-view prediction comprises a prediction associated with a first view of the multiview video picture sequence based on a second view of the multiview video picture sequence; and
   encoding constrainedly intra-coded blocks for inter-view prediction in support of said target views.

15. An encoding apparatus, comprising:
   a processor; and
   a memory communicatively connected to the processor, the memory storing computer coded instructions which, when executed by the processor, cause the apparatus to:
   encode a plurality of picture sequences into coded pictures representing a multiview video coded bitstream, wherein the multiview video comprises a plurality of views of a scene;
   encode a signal element into the bitstream, said signal element indicating that display of a subset M of N coded views requires full decoding of the subset M views only, said subset M views comprising target views within the bitstream, wherein the signal information includes an additional signal element indicating inter-view prediction, wherein the interview prediction comprises a prediction associated with a first view of the multiview video picture sequence based on a second view of the multiview video picture sequence; and
   encode constrainedly intra-coded blocks for inter-view prediction in support of said target views.

16. The encoding apparatus of claim 15, wherein each of the plurality of picture sequences represents a sequence of pictures taken from a particular view.

17. The encoding apparatus of claim 15, wherein the signal element is encoded in a multiview video coding (MVC) sequence parameter set (SPS) extension.

18. The encoding apparatus of claim 15, wherein for picture sequences depended upon by the subset of the plurality of picture sequences, only constrainedly intra-coded blocks are to be decoded for inter-view prediction.

19. The encoding apparatus of claim 18, wherein non-constrainedly intra-coded blocks are to be parsed to the extent that is known that the non-constrainedly intra-coded blocks are not needed for inter-view prediction.

20. The encoding apparatus of claim 15, wherein the signal element indicates a maximum decoding level for a particular picture sequence.

21. The encoding apparatus of claim 15, wherein the signal element indicates a maximum number of reference frames and a required decoded picture buffer size when the subset of the plurality of picture sequences are decoded for playback.

22. The encoding apparatus of claim 15, wherein the additional signal element indicates inter-view prediction of a block coding mode.

23. The encoding apparatus of claim 15, wherein the additional signal element indicates inter-view prediction of motion information.

24. The encoding apparatus of claim 15, wherein the additional signal element indicates inter-view prediction of residual information.

25. The encoding apparatus of claim 15, wherein the additional signal element indicates inter-view prediction of motion compensation.

26. The encoding apparatus of claim 15, wherein the signal information includes a dependency_id value, the dependency_id value corresponding to one of the plurality of picture sequences.

27. The encoding apparatus of claim 15, wherein the signal information includes an indication of whether the bitstream comprises either a multiview bitstream or a scalable video coding bitstream.

28. A method of decoding a plurality of sequences, comprising:
   decoding signal information including a signal element from the bitstream, the signal element indicating that, for the display of a subset of a plurality of picture sequences, only pictures from the subset of the plurality of picture sequences need to be fully decoded, wherein the plurality of picture sequences represents a multiview video coded bitstream, wherein the multiview video comprises a plurality of views of a scene, wherein the signal information includes an additional signal element indicating inter-view prediction, wherein the interview prediction comprises a prediction associated with a first view of the multiview video picture sequence based on a second view of the multiview video picture sequence; and
   selectively decoding the plurality of picture sequences in accordance with the indication provided by the decoded signal element.

29. The method of claim 28, wherein each of the plurality of picture sequences represents a sequence of pictures taken from a particular view.

30. The method of claim 28, wherein the signal element is encoded in a multiview video coding (MVC) sequence parameter set (SPS) extension.

31. The method of claim 28, wherein for picture sequences depended upon by the subset of the plurality of picture sequences, only constrainedly intra-coded blocks are decoded for inter-view prediction.

32. The method of claim 31, wherein non-constrainedly intra-coded blocks are parsed to the extent that is known that the non-constrainedly intra-coded blocks are not needed for inter-view prediction.

33. The method of claim 28, wherein the signal element indicates a maximum decoding level for a particular picture sequence.

34. The method of claim 28, wherein the signal element indicates a maximum number of reference frames and a required decoded picture buffer size when the subset of the plurality of picture sequences are decoded for playback.

35. The method of claim 28, wherein the additional signal element indicates inter-view prediction of a block coding mode.

36. The method of claim 28, wherein the additional signal element indicates inter-view prediction of motion information.

37. The method of claim 28, wherein the additional signal element indicates inter-view prediction of residual information.

38. The method of claim 28, wherein the additional signal element indicates inter-view prediction of motion compensation.

39. The method of claim 28, wherein the signal information includes a dependency_id value, the dependency_id value corresponding to one of the plurality of picture sequences.

40. The method of claim 28, wherein the signal information includes an indication of whether the bitstream comprises either a multiview bitstream or a scalable video coding bitstream.

41. The method of claim 28, further comprising:
storing fully decoded pictures in a decoded picture buffer; and
discarding pictures that are neither from the subset of the plurality of picture sequences nor depended upon by any of the subset of the plurality of picture sequences are discarded.

42. A computer program product, embodied in a non-transitory computer-readable medium, for decoding a plurality of sequences, comprising:
computer code for decoding signal information including a signal element from the bitstream, the signal element indicating that, for the display of a subset of a plurality of picture sequences, only pictures from the subset of the plurality of picture sequences need to be fully decoded, wherein the plurality of picture sequences represents a multiview video coded bitstream, wherein the multiview video comprises a plurality of views of a scene, wherein the signal information includes an additional signal element indicating inter-view prediction, wherein the inter-view prediction comprises a prediction associated with a first view of the multiview video picture sequence based on a second view of the multiview video picture sequence; and
computer code for selectively decoding the plurality of picture sequences in accordance with the indication provided by the decoded signal element.

43. A decoding apparatus, comprising:
a processor; and
a memory unit communicatively connected to the processor and including:
computer code for decoding signal information including a signal element from the bitstream, the signal element indicating that, for the display of a subset of a plurality of picture sequences, only pictures from the subset of the plurality of picture sequences need to be fully decoded, wherein the plurality of picture sequences represents a multiview video coded bitstream, wherein the multiview video comprises a plurality of views of a scene, wherein the signal information includes an additional signal element indicating inter-view prediction, wherein the inter-view prediction comprises a prediction associated with a first view of the multiview video picture sequence based on a second view of the multiview video picture sequence; and
computer code for selectively decoding the plurality of picture sequences in accordance with the indication provided by the decoded signal element.

44. The decoding apparatus of claim 43, wherein each of the plurality of picture sequences represents a sequence of pictures taken from a particular view.

45. The decoding apparatus of claim 43, wherein the signal element is encoded in a multiview video coding (MVC) sequence parameter set (SPS) extension.

46. The decoding apparatus of claim 43, wherein for picture sequences depended upon by the subset of the plurality of picture sequences, only constrainedly intra-coded blocks are to be decoded for inter-view prediction.

47. The encoding apparatus of claim 46, wherein non-constrainedly intra-coded blocks are to be parsed to the extent that is known that the non-constrainedly intra-coded blocks are not needed for inter-view prediction.

48. The decoding apparatus of claim 43, wherein the signal element indicates a maximum decoding level for a particular picture sequence.

49. The decoding apparatus of claim 43, wherein the signal element indicates a maximum number of reference frames and a required decoded picture buffer size when the subset of the plurality of picture sequences are decoded for playback.

50. The decoding apparatus of claim 43, wherein the additional signal element indicates inter-view prediction of a block coding mode.

51. The decoding apparatus of claim 43, wherein the additional signal element indicates inter-view prediction of motion information.

52. The decoding apparatus of claim 43, wherein the additional signal element indicates inter-view prediction of residual information.

53. The decoding apparatus of claim 43, wherein the additional signal element indicates inter-view prediction of motion compensation.

54. The decoding apparatus of claim 43, wherein the signal information includes a dependency_id value, the dependency_id value corresponding to one of the plurality of picture sequences.

55. The decoding apparatus of claim 43, wherein the signal information includes an indication of whether the bitstream comprises either a multiview bitstream or a scalable video coding bitstream.

56. The decoding apparatus of claim 43, wherein the memory unit further comprises:
computer code for storing fully decoded pictures in a decoded picture buffer; and
computer code for discarding pictures that are neither from the subset of the plurality of picture sequences nor depended upon by any of the subset of the plurality of picture sequences are discarded.

* * * * *